Nov. 16, 1943.　　　　A. Y. DODGE　　　　2,334,394
TRANSMISSION
Filed Nov. 21, 1941
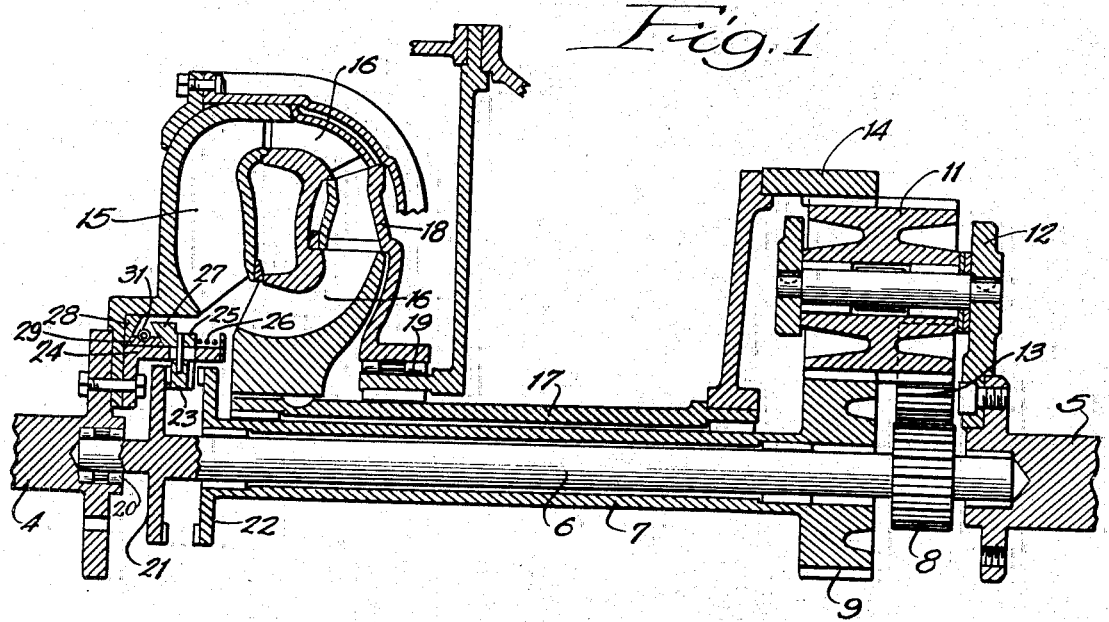
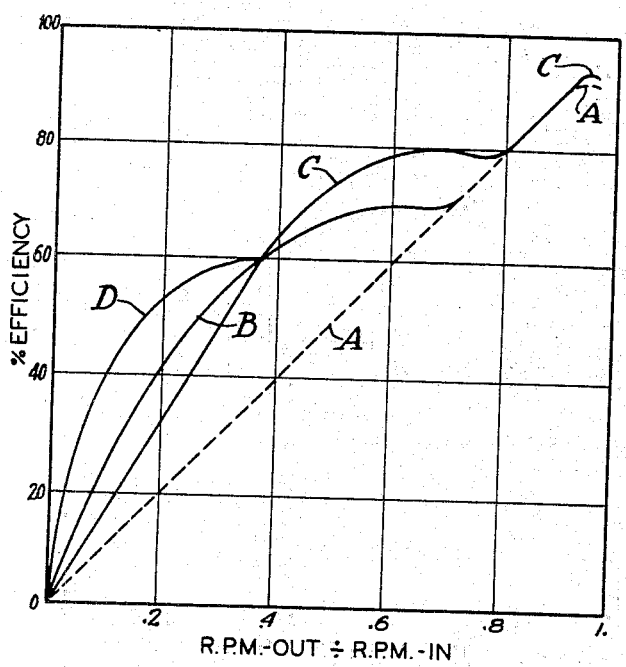
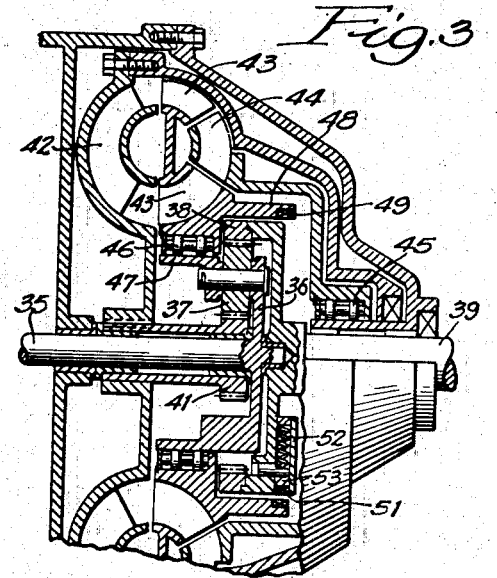
Inventor:
Adiel Y. Dodge,
By Dawson, Oome & Borth,
Attorneys.

Patented Nov. 16, 1943

2,334,394

UNITED STATES PATENT OFFICE 2,334,394

TRANSMISSION

Adiel Y. Dodge, Rockford, Ill.

Application November 21, 1941, Serial No. 419,883

17 Claims. (Cl. 74—189.5)

This invention relates to transmissions, and more particularly to hydraulic transmissions of a type suitable for use in automotive vehicles.

Various types of hydraulic transmissions have heretofore been proposed for use in automotive vehicles, of a type in which an infinite number of speed and torque ratios are provided. Such transmissions have been subject to the disadvantage that they produce their maximum efficiency at one particular speed and torque ratio, so that either an insufficient torque is provided at low vehicle speeds to overcome difficult starting conditions or efficiency is lost at ranges approaching one-to-one.

One of the objects of the present invention is to provide a transmission which will provide a high starting torque and at the same time will operate at extremely high efficiency as the ratio approaches one-to-one.

Another object of the invention is to provide a transmission in which the driving connections are automatically changed to provide a high torque at low speeds and maximum efficiency throughout the full operating range.

Still another object of the invention is to provide a transmission in which the torque is transmitted through a regenerative power circuit at low speeds and through two parallel paths of power flow at high speeds.

The above and other objects, advantages and desirable features of the invention will be apparent from the following description when read in connection with the accompanying drawing, in which:

Figure 1 is a diagrammatic sectional view of a transmission embodying the invention;

Figure 2 is a graph illustrating graphically the manner of operation of the transmission; and Figure 3 is a view similar to Figure 1, showing an alternative construction.

Referring first to the graph shown in Figure 2, there are illustrated a series of curves, indicating the manner of operation of transmissions of different types. The curve A is the operating curve of a hydraulic clutch, and as will be seen, is a substantially straight line until it reaches the peak efficiency, at which time it levels off. The curve B is the operating curve of a hydraulic torque converter which, as will be seen, provides much higher efficiency at lower speed ratios. If the hydraulic torque converter employed is of a broad range type capable of operating as a fluid clutch, the curve B will merge into the curve A at the upper end thereof. The curve C is the operating curve of a transmission including a hydraulic torque converter connected in parallel with a differential gear set to provide two paths of power flow, as is more particularly described and claimed in my Patent No. 2,242,515. It will be noted that this curve provides a somewhat lower efficiency than the straight hydraulic torque converter in the lower ranges, but reaches a much higher peak efficiency before merging into the clutch curve A, and that due to the two path operation, it reaches a higher peak efficiency than that of the hydraulic clutch of similar size. The curve D is the operating curve of a regenerative hook-up, including a hydraulic torque converter. It will be noted that this curve provides a very high efficiency at low speed ratios, but that its peak efficiency is very low.

As will be apparent from the several curves, the most desirable results can be produced by following the curve D to its point of intersection with curve C, and thereafter by following the curve C. The present invention provides a transmission operating in this fashion.

The transmission of Figure 1 connects a driving shaft 4 to a driven shaft 5, and includes an intermediate shaft 6, journalled at its ends in the driving and driven shafts. A sleeve shaft 7 surrounds and is rotatable on the shaft 6, and the two shafts carry pinions 8 and 9 respectively, adjacent one end thereof. The pinion 9 meshes directly with planet pinions 11, carried by a gear carrier 12, which is connected to the driven shaft 5. The pinion 8 meshes with an idler 13, which in turn meshes with the planet pinions 11. A ring gear 14, also meshing with the planet pinions 11, provides, with the several pinions, a four-element differential gear set in which pinions 8 and 9 have an opposite rotational sense.

The driving shaft 4 is connected to the impeller or driving member 15 of a hydraulic torque converter, which includes spaced sets of rotor vanes 16 connected to the ring gear 14 through a sleeve 17. A stator 18 is arranged between the sets of rotor vanes, and is held against rotation in one direction by a one-way brake 19, which permits it to rotate freely in the opposite direction. A hydraulic torque converter of this type operates to effect a substantial multiplication of torque at high relative speeds of the impeller and rotor, and also produces a high degree of efficiency as the speeds approach one-to-one, partly due to freeing of the stator.

The shafts 6 and 7 are adapted to be connected alternately to the driving shaft to provide either a regenerative power circuit or a two-path hook-up. For this purpose clutch means are provided, shown as comprising a one-way clutch 20 between the driving shaft 4 and the intermediate shaft 6, to prevent the shaft 6 from overrunning the driving shaft in the forward direction, but permitting the driving shaft to overrun the intermediate shaft. A second clutch of any desired type, as for example, the hydraulic clutch shown in my co-pending application, Serial No. 420,497, filed November 26, 1941, may be provided to connect the driving shaft 4 to the shaft 7. As shown, the second clutch is of a simple mechanical type, including flanges 21 and 22 on the shafts 6 and 7 respectively, having on their adjacent faces clutch teeth adapted to be engaged by a shiftable clutch member 23, which is carried by and movable on a circular flange 24 connected to the driving shaft. The clutch is adapted to be operated by a collar 25 slidable on the flange 24, and connected to the clutch member 23 by a pin extending through a slot in the collar. A spring 26 normally urges the collar 25 to the left, as seen in Figure 1, to connect the flange 21 to the flange 24, thereby connecting the driving shaft 4 to the intermediate shaft 6. This connection supplements the one-way clutch 20, but it will be apparent that, if desired, the flange 21 could be omitted.

In order to shift the collar 25 to the right, the collar is provided with a tapered flange 27, and a similar flange portion 28 is formed on the driving member. A plurality of wedge shaped centrifugal weights 29 lie between the flanges 27 and 28, and are normally held in by a garter spring 31. As the speed of the driving shaft increases, the weights 29 will tend to fly out, camming the collar 25 to the right, thereby to shift the clutch 23 into engagement with the teeth on flange 22 to connect the driving shaft to the sleeve shaft 7.

In operation, with the parts in the position shown, torque is transmitted from the driving shaft 4 through the hydraulic torque converter to the sleeve 17 and the ring gear 14. As the ring gear turns in the forward direction, it tends to turn the planet carrier 12 in the forward direction, and through reaction on the planet carrier and the idler gear 13, tends to turn the pinion 8 forwardly.

With the clutch 21—23 engaged, the pinion 8 is positively connected to the driving shaft. However, the torque impressed on the pinion through operation of the gears 11 and 14 will be higher than the driving shaft torque due to the multiplication effected in the torque converter and the gearing so that torque flow will be in a direction from the pinion to the driving shaft. Thus the pinion 8 will tend to turn the driving shaft forwardly through shaft 6 and the one-way clutch 20 or the clutch mechanism 21—23 to produce a torque regenerative circuit.

Thus, this hook-up provides a regenerative type of circuit, in which the torque flows around and builds up on itself to increase the torque applied to the driven shaft according to the curve D of Figure 2.

When the speed reaches a point at which curve D intersects curve C, the weights 29 will tend to force the collar 25 to the right to connect the sleeve shaft 7 to the driving shaft. Upon a brief interruption of torque, as when the operator's foot is removed from the accelerator pedal, this shift will occur. In this position, both the impeller 15 and the pinion 9 are rotated forwardly by the driving shaft, and both coact on the planet pinions 11 to turn the carrier and the driven shaft forwardly, and the one-way clutch 20 overruns. It will be noted that in this hook-up, reaction of the driven shaft through the gearing tends to turn both the pinion 9 and the ring gear 14 in the direction opposite to that in which they are turned by the driving shaft, so that there is no regeneration of power flow. At this time, the transmission operates in the manner more fully explained in my Patent No. 2,242,515, to follow the curve C. Thus, the maximum efficiency under all operating conditions is obtained.

In the construction shown in Figure 3, a driving shaft 35 is connected to a gear carrier 36, which carries a series of planet pinions 37. The pinions mesh with a ring gear 38, which is connected to the driven shaft 39, and also with a sun gear 41, which is connected to the impeller 42 of a hydraulic torque converter. The torque converter includes spaced rotor vanes 43, and a stator 44, arranged therebetween, and held against rotation in one direction by a one-way brake 45. The rotor is connected by a one-way clutch 46, with a sleeve 47 on the gear carrier 36 so that the rotor will tend to drive the gear carrier forward, but will not be driven forward thereby.

In this construction, as so far described, a regenerative power circuit is provided with torque from the driving shaft, being divided at the planet gears. A part of the torque is transmitted directly to the ring gear and driven shaft, while the remainder, acting through the sun gear, drives the impeller 42. Torque transmitted through the hydraulic torque converter and multiplied thereby is transmitted through the one-way clutch 46 back to the driving shaft to increase the applied torque thereto. This construction thus provides a regenerative power circuit operating substantially on the curve D of Figure 2.

In order to change the transmission to a two-path parallel circuit, there is provided a circular flange 48 on the rotor 43, formed at its outer end with clutch teeth 49. The clutch teeth 49 are adapted to be engaged by a pawl 51, slidably carried by the ring gear 38. The pawl is normally held inwardly by a spring 52, acting between the lower portion of the pawl, which may be cut out to receive the spring, and a fixed abutment 53 on the ring gear. When the speed of the ring gear increases sufficiently, the pawl 51 moves outwardly into engagement with the clutch teeth 49 to connect the ring gear directly to the rotor 43 of the hydraulic torque converter. At this time, a part of the torque of the driving shaft is transmitted directly to the ring gear and driven shaft, while the remainder passes through the sun gear to the torque converter and then directly to the driven shaft. Thus two parallel paths of power flow are provided so that the transmission will operate along the curve C of Figure 2.

While two embodiments of the invention have been shown and described in detail, it will be understood that the invention might be embodied in other forms, and that those shown are illustrative only, reference being had to the appended claims to determine the scope of the invention.

What is claimed is:

1. A transmission for connecting driving and driven shafts comprising an infinitely variable speed torque transmitting unit, a differential gear set, means connecting one element of the gear set to one of the shafts, means connecting one member of the torque transmitting unit to one of the shafts, and clutch means operable in one condition to connect one of the shafts to another element of the gear set thereby to provide a regenerative power circuit between the shafts through the unit and gear set, and in another condition to connect one of the shafts to a third element of the gear set thereby to provide two parallel paths of power flow between the shafts with the unit in one path.

2. A transmission for connecting driving and driven shafts comprising an infinitely variable speed torque transmitting unit, a differential gear set, means connecting one element of the gear set to one of the shafts, means connecting one member of the torque transmitting unit to the other shaft, means connecting another element of the gear set to another member of the unit, means connecting said other shaft to a third element of the gear set, one of said last two named means being a clutch controllable to change the connections from one element to another element of the gear set to change the transmission from a regenerative power circuit to a two-path non-regenerative power circuit.

3. A transmission for connecting driving and driven shafts comprising an infinitely variable speed torque transmitting unit, a differential gear set, means connecting one element of the gear set to one of the shafts, means connecting one member of the torque transmitting unit to the other shaft, means connecting another element of the gear set to another member of the unit, means connecting said other shaft to a third element of the gear set, one of said last two named means being a clutch shiftable to change the connections from one element to another element of the gear set to change the transmission from a regenerative power circuit to a two-path non-regenerative power circuit, and means responsive to the speed of one of the shafts to shift the clutch.

4. A transmission for connecting driving and driven shafts comprising a hydraulic torque transmitting unit having driving and driven members, a differential gear set having four elements, one of the shafts being connected to one element of the gear set and the other shaft being connected to one member of the hydraulic unit, means connecting the other member of the hydraulic unit to another element of the gear set, means connecting a third element of the gear set to said other shaft, the fourth element of the gear set cooperating with the first three to produce rotation in an opposite sense, and one of said means being a shiftable clutch to connect said fourth element of the gear set to one of the shafts or to free said fourth element.

5. A transmission for connecting driving and driven shafts comprising a hydraulic torque converter having a vaned driving member, a vaned driven member, and a vaned stator, a differential gear set having four elements, one of the shafts being connected to one element of the gear set and the other shaft being connected to one member of the hydraulic unit, means connecting the other member of the hydraulic unit to another element of the gear set, means connecting a third element of the gear set to said other shaft, the fourth element of the gear set cooperating with the first three to produce rotation in an opposite sense, and one of said means being a shiftable clutch to connect said fourth element of the gear set to one of the shafts or to free said fourth element.

6. A transmission for connecting driving and driven shafts comprising a hydraulic torque transmitting unit having driving and driven members, a differential gear set, means connecting one element of the gear set to the driven shaft, means connecting another element of the gear set to one of the members, means connecting a third element of the gear set to the driving shaft, means connecting the other of the members to the driving shaft to provide a regenerative power circuit bewteen the driving and driven shafts, and one of said means being a shiftable clutch operable to change the connections to the gear set to provide two parallel paths of power flow between the driving and driven shafts.

7. A transmission for connecting driving and driven shafts comprising a hydraulic torque converter having a vaned driving member, a vaned driven member, and a vaned stator, a differential gear set, means connecting one element of the gear set to the driven shaft, means connecting another element of the gear set to one of the members, means connecting a third element of the gear set to the driving shaft, means connecting the other of the members to the driving shaft to provide a regenerative power circuit between the driving and driven shafts, and one of said means being a shiftable clutch operable to change the connections to the gear set to provide two parallel paths of power flow between the driving and driven shafts.

8. A transmission for connecting a driving shaft to a driven shaft comprisng a hydraulic torque transmitting unit having driving and driven members, a differential gear set having four elements, one of which is connected to the driven shaft and another of which is connected to the driven member of the hydraulic unit, means connecting the driving member of the hydraulic unit to the driving shaft, and a clutch for alternately connecting the driving shaft to two other elements of the gear set.

9. A transmission for connecting a driving shaft to a driven shaft comprising a hydraulic torque transmitting unit having driving and driven members, a differential gear set having four elements, one of which is connected to the driven shaft and another of which is connected to the driven member of the hydraulic unit, means connecting the driving member of the hydraulic unit to the driving shaft, a clutch for alternately connecting the driving shaft to two other elements of the gear set, and means responsive to the speed of one of the shafts to shift the clutch.

10. A transmission for connecting a driving shaft to a driven shaft comprising a hydraulic torque converter having vaned driving and driven members and a vaned stator, a differential gear set having four elements, one of which is connected to the driven shaft and another of which is connected to the driven member of the hydraulic unit, means connecting the driving member of the hydraulic unit to the driving shaft, and a clutch for alternately connecting the driving shaft to two other elements of the gear set.

11. A transmission for connecting aligned driving and driven shafts comprising an intermediate shaft between the driving and driven shafts, a sleeve shaft coaxial with the intermediate shaft, a differential gear set having two elements connected respectively to the intermediate shaft and the sleeve shaft, a hydraulic torque transmitting unit having driving and driven members, means connecting the driving member to the driving shaft, means connecting the driven member to a third element of the gear set, a fourth element of the gear set being connected to the driven shaft, and a clutch for alternately connecting the driving shaft to either the intermediate shaft or the sleeve shaft.

12. A transmission for connecting aligned driving and driven shafts comprising an intermediate shaft between the driving and driven shafts, a sleeve shaft coaxial with the intermediate shaft, a differential gear set having two elements connected respectively to the intermediate shaft and the sleeve shaft, a hydraulic torque converter having vaned driving and driven members and a vaned stator, means connecting the driving member to the driving shaft, means connecting the driven member to a third element of the gear set, a fourth element of the gear set being connected to the driven shaft, and a clutch for alternately connecting the driving shaft to either the intermediate shaft or the sleeve shaft.

13. A transmission for connecting aligned driving and driven shafts comprising an intermediate shaft between the driving and driven shafts, a sleeve shaft coaxial with the intermediate shaft, a differential gear set having two elements connected respectively to the intermediate shaft and the sleeve shaft, a hydraulic torque transmitting unit having driving and driven members, means connecting the driving member to the driving shaft, means connecting the driven member to a third element of the gear set, a fourth element of the gear set being connected to the driven shaft, a clutch for alternately connecting the driving shaft to either the intermediate shaft or the sleeve shaft, and means responsive to the speed of one of the shafts to shift the clutch.

14. A transmission for connecting driving and driven shafts comprising a differential gear set, a hydraulic torque transmitting unit having driving and driven members, one element of the gear set being connected to the driving shaft and another element being connected to the driven shaft, means connecting a third element of the gear set to the driving member, and clutch means for alternately connecting the driven member to either the driving shaft or the driven shaft.

15. A transmission for connecting driving and driven shafts comprising a differential gear set, a hydraulic torque transmitting unit having driving and driven members, one element of the gear set being connected to the driving shaft and another element being connected to the driven shaft, means connecting a third element of the gear set to the driving member, and clutch means for alternately connecting the driven member either to the driving shaft or to the driven shaft, said clutch means being controlled in response to the speed of one of the shafts.

16. A transmission for connecting driving and driven shafts comprising a differential gear set, a hydraulic torque converter having vaned driving and driven members and a vaned stator, one element of the gear set being connected to the driving shaft and another element being connected to the driven shaft, means connecting a third element of the gear set to the driving member, and clutch means for alternately connecting the driven member either to the driving shaft or to the driven shaft.

17. A transmission for connecting driving and driven shafts comprising a hydraulic torque transmitting device having driving and driven members, a differential gear set, means connecting one element of the gear set to the driving shaft, means connecting another element of the gear set to said driving member, one-way clutch means connecting said driven member to the driving shaft so that the driven member tends to drive the driving shaft forwardly, and speed responsive clutch means responsive to the speed of the driven shaft for connecting the driven shaft and said driven member.

ADIEL Y. DODGE.